US 12,412,066 B2

(12) United States Patent
Forster

(10) Patent No.: US 12,412,066 B2
(45) Date of Patent: Sep. 9, 2025

(54) FLEXIBLE RFID TAG HAVING A HELICAL ANTENNA AND AN OBJECT GRIPPED WITHIN THE HELICAL ANTENNA

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/839,139

(22) PCT Filed: Feb. 28, 2023

(86) PCT No.: PCT/IB2023/051871
§ 371 (c)(1),
(2) Date: Aug. 16, 2024

(87) PCT Pub. No.: WO2023/166426
PCT Pub. Date: Sep. 7, 2023

(65) Prior Publication Data
US 2025/0165741 A1    May 22, 2025

Related U.S. Application Data

(60) Provisional application No. 63/315,639, filed on Mar. 2, 2022.

(51) Int. Cl.
*G06K 19/077* (2006.01)
*H01Q 1/22* (2006.01)
(Continued)

(52) U.S. Cl.
CPC ..... *G06K 19/07775* (2013.01); *H01Q 1/2216* (2013.01); *H01Q 1/2283* (2013.01); *H01Q 1/36* (2013.01); *H01Q 7/06* (2013.01)

(58) Field of Classification Search
CPC ....... H01Q 1/362; H01Q 11/08; H01Q 11/086
(Continued)

(56) References Cited

U.S. PATENT DOCUMENTS

2005/0133131 A1\* 6/2005 Starinshak ........... H01Q 1/2241
156/110.1
2007/0159336 A1    7/2007 Tethrake et al.
(Continued)

FOREIGN PATENT DOCUMENTS

EP         1454770 A1 \*  9/2004 ......... B60C 23/0493
WO    2016/053951        4/2016
(Continued)

OTHER PUBLICATIONS

Machine translation of WO2019186068 retrieved from European Patent Office on Mar. 11, 2025 (Year: 2025).\*
(Continued)

*Primary Examiner* — Suezu Ellis

(57) ABSTRACT

A flexible RFID wire tag includes an RFID chip and an associated antenna formed of a deformable filament. The antenna may be helically shaped and deformable from an initial helical configuration to an expanded helical configuration having a greater diameter. An object or a portion of an object is positioned within an open interior of the helical antenna and then the antenna is returned from the expanded configuration to the initial configuration to cause the antenna to contact and grip the object. In another aspect, first and second ends of the antenna are secured to an object, with the filament being configured to deform and/or vibrate upon being subjected to a stimulus so as to modify at least one operational parameter of the antenna. Such a deformable filament may be helical or may be differently configured, such as to be incorporated into a cardboard ticket.

22 Claims, 7 Drawing Sheets

(51) Int. Cl.
*H01Q 1/36* (2006.01)
*H01Q 7/06* (2006.01)

(58) Field of Classification Search
USPC .......................... 235/492; 340/572.1, 572.7
See application file for complete search history.

(56) References Cited

U.S. PATENT DOCUMENTS

2008/0158072 A1* 7/2008 Logan .............. G06K 19/07786
340/447
2022/0388354 A1* 12/2022 Destraves ........... B60C 23/0452

FOREIGN PATENT DOCUMENTS

WO      2016/200519      12/2016
WO      2019/186068      10/2019

OTHER PUBLICATIONS

International Search Report and Written Opinion dated Jun. 29, 2023 issued in corresponding IA No. PCT/IB2023/051871 filed Feb. 28, 2023.

* cited by examiner

FLEXIBLE RFID TAG HAVING A HELICAL ANTENNA AND AN OBJECT GRIPPED WITHIN THE HELICAL ANTENNA

CROSS-REFERENCE TO RELATED APPLICATION(S)

The present application is a national stage application under 35 U.S.C. § 371 of International Application No. PCT/IB2023/051871, which was published in English on Sep. 7, 2023, and claims the benefit of U.S. Provisional Patent Application No. 63/315,639 filed Mar. 2, 2022, each of which is incorporated by reference herein in its entirety.

FIELD

The present disclosure relates to radio frequency identification ("RFID") tags. More particularly, the present disclosure relates to flexible wire RFID tags.

BACKGROUND

RFID tags are widely used to associate an object with a unique identification code. The RFID tag is used in combination with an RFID reader that sends signals to and receives signals from any RFID tags within the read field of the RFID reader in order to locate/identify the tag as well as any additional information stored within the tag.

Metallic wire has long been used to manufacture RFID antenna structures. Depending on the nature of the wire, it can exhibit characteristics of strength, flexibility, and being a good conductor of radio frequency ("RF") energy. Incorporation of wire antennas into threads, or yarns, facilitating insertion of antenna-containing RFID devices into clothing items or other soft goods for inventory control, identification, labeling, tracking, and/or theft prevention purposes has been investigated. However, wire antennas have other properties that may not be used to full advantage in such applications. Accordingly, it would be advantageous to provide flexible wire RFID tags that better capitalize on the characteristics of such devices.

SUMMARY

There are several aspects of the present disclosure which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

Flexible RFID wire tags including or containing an RFID chip and a helical antenna associated with the RFID chip are described herein. In some aspects of the invention, the helical antenna is configured to be deformed from an initial helical configuration in which an open interior of the helical antenna has a first diameter to an expanded helical configuration in which the open interior of the helical antenna has a second diameter that is greater than the first diameter. In some embodiments, the flexible RFID wire tag is configured to return the helical antenna from the expanded helical configuration toward the initial helical configuration, such that an object or a portion of an object positioned within the open interior of the helical antenna in the expanded helical configuration and having an outer diameter greater than the first diameter will be contacted and gripped by the flexible RFID wire tag as the helical antenna is returned from the expanded helical configuration toward the initial helical configuration.

In one aspect of the invention, the tag is as described above and further includes or contains at least one gripping element configured to have a greater sliding friction with the object or portion of an object than the helical antenna.

In one aspect of the invention, the tag is as described above and further includes or contains an adhesive positioned at discrete locations along the helical antenna and configured to adhere the helical antenna to at least a portion of the object.

In one aspect of the invention, the tag is as described above and the tag includes or contains a heat shrink sleeve around at least a portion of the helical antenna, upon heating the heat shrink sleeve returns the helical antenna form the expanded configuration toward the initial configuration.

In one aspect of the invention, the tag is as described above and the pitch of a first section of the helical antenna is different from a pitch of a second section of the helical antenna.

In one aspect of the invention, the tag is as described above and the RFID chip is incorporated into a reactive strap with a wire loop of known resistance.

In one aspect of the invention, the tag is as described above and the antenna includes or contains a deformable filament or fiber extending between first and second ends of the antenna. The first and second ends of the antenna are secured to an object, with the antenna being configured to be deformed and/or to vibrate upon being subjected to a stimulus so as to modify at least one of its operational parameters.

In one aspect of the invention, the tag contains a filament or fiber as described above and the first and second ends of the antenna are secured to an object including a frame defining a cavity, with the antenna extending across the cavity. The antenna is configured to be deformed and/or to vibrate upon being subjected to a stimulus so as to modify at least one of its operational parameters. In some embodiments, the stimulus that deforms the antenna is movement of the object.

In one aspect of the invention, the tag contains the deformable filament or fiber as described above and wherein the RFID chip is incorporated into a reactive strap having a wire loop of known resonance.

Methods for providing and/or for securing a flexible RFID wire tag to an object or a portion of an object are also described herein. In one aspect of the invention, the method includes providing a flexible RFID wire tag including an RFID chip and a helical antenna associated with the RFID chip. In one aspect of the invention, the helical antenna is deformed from an initial helical configuration in which an open interior of the helical antenna has a first diameter to an expanded helical configuration in which the open interior of the helical antenna has a second diameter that is greater than the first diameter. In one aspect of the invention, an object or a portion of an object having an outer diameter greater than the first diameter is positioned within the open interior of the helical antenna in the expanded helical configuration. In one aspect of the invention, the helical antenna is returned from the expanded helical configuration toward the initial helical configuration so as to cause the object or portion of an object to be contacted and gripped by the helical antenna as the helical antenna is returned from the expanded helical configuration toward the initial helical configuration.

In one aspect of the invention, the method is as described above and the RFID tag has a heat shrink sleeve around at least a portion of the helical antenna. In one aspect of the invention, the helical antenna is deformed from an initial helical configuration in which an open interior of the helical antenna has a first diameter to an expanded helical configuration in which the open interior of the helical antenna has a second diameter that is greater than the first diameter. In one aspect of the invention, an object or a portion of an object having an outer diameter greater than the first diameter is positioned within the open interior of the helical antenna in the expanded helical configuration. In one aspect of the invention, the helical antenna is returned from the expanded helical configuration toward the initial helical configuration following heating the heat shrink sleeve so as to cause the object or portion of an object to be contacted and gripped by the helical antenna as the helical antenna is returned from the expanded helical configuration toward the initial helical configuration.

In one aspect of the invention, the method is as described above and the method further includes securing ends of the helical antenna to the object so as to allow antenna deformation to modify at least one operational parameter of the helical antenna. In some embodiments, the deformation is caused by movement of the object or a portion of the object.

DETAILED DESCRIPTION

The aspects of the invention disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 1:
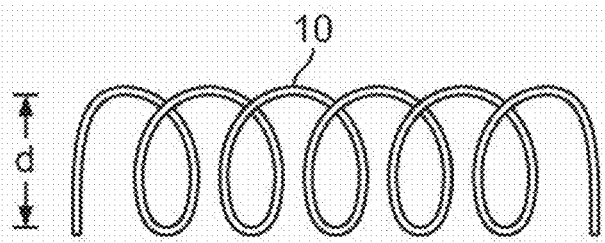
FIG. 1 is a side elevational view of a helical antenna that may be incorporated into a flexible wire RFID tag according to the present disclosure, with the helical antenna in an initial helical configuration.

FIG. 1 shows an exemplary antenna 10 that may be incorporated into a flexible RFID tag according to the present disclosure. The antenna 10 is configured as a helix and is, thus, referred to herein as a helical antenna.

In one aspect of the invention, the helical antenna 10 is a deformable filament or fiber at least partially formed of a conductive material, such as a metallic material or non-metallic material, to allow an electrical current to flow through the helical antenna 10. This may include the helical antenna 10 being entirely formed of a single, conductive material or the helical antenna 10 being formed of at least two different materials, with one having superior conductive properties to the other(s).

Figure 2:
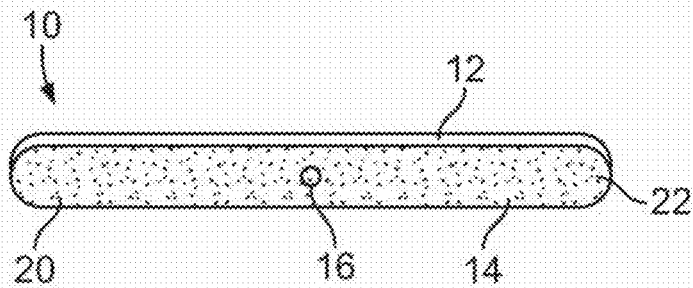
FIG. 2 is a side elevational view of an exemplary filament or fiber that may be used to form the helical antenna of FIG. 1.

In one example, which is shown in FIG. 2, the helical antenna 10 contains a core 12 at least partially surrounded or overlaid by a coating 14. In one aspect of the invention, the core 12 is formed of a first material, while the coating 14 is formed of a second material having greater conductivity than the first material. In one aspect of the invention, the core 12 may be formed of a first metallic material and a coating 14 formed of a second metallic material. Such a configuration may be advantageous if the core material has advantageous properties, but a conductivity that is lower than desired. For example, the core 12 may contain a memory strand such as a memory wire. Such materials are also referred to shape memory materials and include both metallic and non-metallic materials, such as shape memory polymers. An example of a memory wire includes a strand formed of a spring steel material, which is capable of resilient deformation (as will be described in greater detail herein), but has a conductivity that may be undesirably low. In this case, the coating material may be copper or silver, which are much better conductors than spring steel.

In one aspect of the invention, rather than being formed of two metallic materials, a helical antenna 10 may be at least partially formed of a non-metallic material. For example, in one embodiment, the core 12 is a polymeric (e.g., plastic) material, while the coating 14 is a conductive ink or metallic (e.g., foil) material or some other conductive material. In one aspect of the invention, the polymeric plastic material may be imbued with the ability to resiliently deform by winding it around a suitably sized mandrel and applying heat, thereby resulting in a spring tag capable of gripping items, as will be described in greater detail herein.

Regardless of the nature of the core and coating materials, when applying the coating 14, it may be advantageous to consider the appropriate skin depth in view of the expected operating frequency of the helical antenna 10.

In addition to the material composition of the helical antenna 10 being subject to variation, it is also within the scope of the present disclosure for the shape of the helical antenna 10 to vary. For example, the helical antenna 10 may be formed of a filament or fiber having a circular cross section or a non-circular cross section (e.g., a square, rectangle, triangle, elliptical, etc.). In some embodiments, a circular cross section may be more common when employing a metallic filament or fiber, while a non-circular cross section may be more common when employing a core 12 formed of a polymeric (e.g., plastic) material. However, it should be understood that the material composition of the helical antenna 10 does not dictate the shape of its cross section. Additionally, the length of the filament or fiber used to form the helical antenna 10, the pitch of the resulting helix, and the diameter of the open interior defined by the helical antenna 10 may also vary without departing from the scope of the present disclosure.

Figure 3:
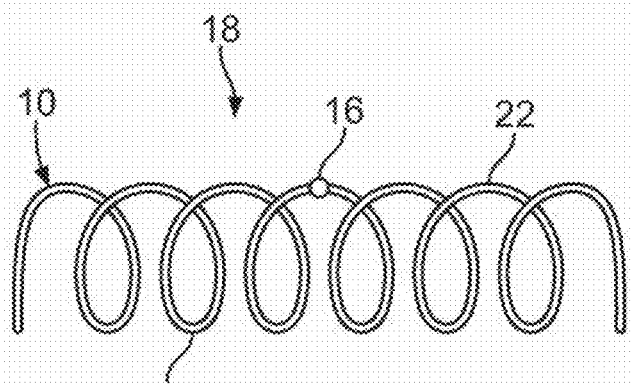
FIG. 3 is a side elevational view of a helical antenna with an RFID chip secured thereto to define a flexible wire RFID tag.

Regardless of the particular configuration of the helical antenna 10, it is provided with an associated RFID chip. The RFID chip may be variously configured, for example, including an integrated circuit for controlling RF communication and other functions of the tag. FIG. 3 shows an RFID chip 16 secured to the helical antenna 10 to define a flexible wire RFID tag 18, with the RFID chip 16 effectively partitioning the helical antenna 10 into a first section 20 positioned on one side of the RFID chip 16 and a second section 22 positioned on the opposite side of the RFID chip 16. The first and second sections 20 and 22 may be substantially identically configured or may be differently configured (e.g., with different lengths and/or pitches).

Figure 4:
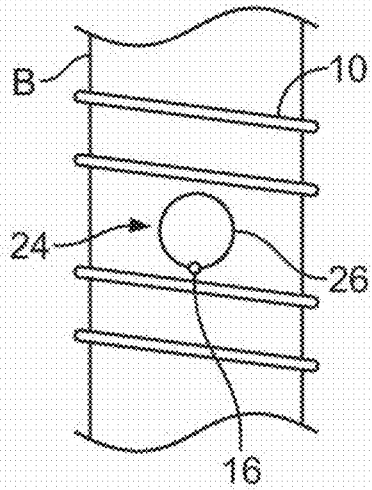
FIG. 4 is a side elevational view of a helical antenna and a reactive strap of a flexible wire RFID tag secured to an object.

It should be understood that the RFID chip 16 is not necessarily secured to the helical antenna 10, but that the RFID chip 16 may be otherwise associated with the helical antenna 10, e.g., inductively coupled, magnetically coupled, or electrically coupled. For example, FIG. 4 shows an RFID chip 16 incorporated into a reactive strap 24, which is separate from the helical antenna 10. In the embodiment of FIG. 4, the reactive strap 24 contains a wire loop 26 having a known resonance, with the RFID chip 16 being secured to the wire loop 26. The reactive strap 24 is placed into the vicinity of the helical antenna 10, such as between adjacent loops of the helical antenna 10, as shown in FIG. 4, to form a far-field UHF (ultra-high frequency) RFID tag in which the RFID chip 16 is wirelessly (e.g., inductively) associated with the helical antenna 10. Such a configuration may be advantageous to the extent that stress on the RFID chip 16 caused by movement of the helical antenna 10 may be eliminated, which increases the mechanical robustness of the flexible wire RFID tag and may simplify manufacture of the flexible wire RFID tag (as inserting an RFID chip 16 into a filament or fiber may be complex). Additionally, if the helical coil 10 is removed, such as part of opening a bottle when the helical antenna 10 and reactive strap 24 are secured to a bottle, the reactive strap 24 may remain fixed to the object and provide short-range RFID functionality.

Figure 5:
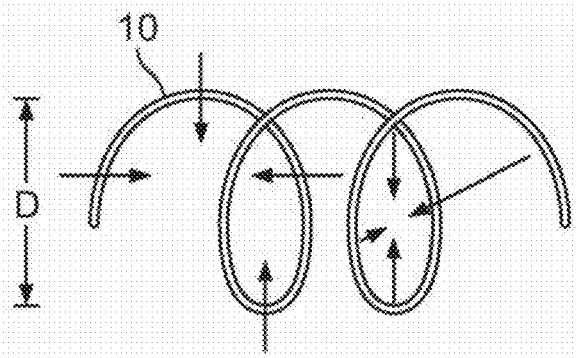
FIG. 5 is a side elevational view of the helical antenna of FIG. 1, in an expanded helical configuration.

In one embodiment, the helical antenna 10 is configured to be resiliently deformable, as illustrated in FIGS. 1 and 5. The helical antenna 10 is shown in an initial helical configuration in FIG. 1, with the open interior of the helical antenna 10 having a first diameter, which is identified as "d". FIG. 5 shows the helical antenna 10 in an expanded helical configuration in which the helical antenna 10 is deformed to increase the diameter of the open interior of the helical antenna 10 to a second diameter, which is identified as "D". FIG. 5 shows a plurality of arrows, which indicate the tendency of the helical antenna 10 to return from the expanded helical configuration toward and, in the absence of any obstacle, to the initial helical configuration of FIG. 1.

In some embodiments, this resilient deformability may be employed to secure the helical antenna 10 to an object or to a portion of an object. For example, FIG. 4 shows the helical antenna 10 secured to a cylindrical object or cylindrical portion of an object, such as the neck of a bottle, which is identified as "B". To secure the helical antenna 10 to the object B, the helical antenna 10 is first moved from its initial helical configuration (FIG. 1) to an expanded helical configuration (FIG. 5) in which the diameter D of the open interior of the helical antenna 10 is greater than the outer diameter of the object B to which the helical antenna 10 is to be secured. This may be achieved by applying any suitable force to the helical antenna 10, which may include sliding the helical antenna 10 onto a mandrel or other object having a larger diameter.

With the object B positioned within the open interior of the helical antenna 10 (in the expanded helical configuration), the force retaining the helical antenna 10 in the expanded helical configuration is released, which causes the helical antenna 10 to return toward its initial helical configuration (rather than being permanently deformed to the expanded helical configuration). The object B has an outer diameter that is greater than the diameter d of the helical antenna 10 in its initial helical configuration, such that movement of the helical antenna 10 from the expanded helical configuration toward its initial helical configuration brings the helical antenna 10 into contact with the object B, as in FIG. 4. The helical antenna 10 continues to attempt to resiliently return to its initial configuration, but is prevented from doing so due to the presence of the object B, thereby causing the helical antenna 10 to grip and be retained upon the object B.

It should be understood that the helical antenna 10 may be applied to any object B having a diameter greater than the diameter d of the open interior of the helical antenna 10 in its initial helical configuration (to allow the helical antenna 10 to grip the object B) and smaller than the diameter D of the open interior of the helical antenna 10 in its expanded helical configuration (to allow the object B to be placed within the open interior of the helical antenna 10). Objects having a larger diameter will tend to be gripped more tightly by a given helical antenna 10 than objects having a smaller diameter (due to the helical antenna 10 more forcefully attempting to return to its initial helical configuration at a larger diameter). Objects having a larger diameter will tend to cause a given helical antenna 10 to have fewer loops than objects having a smaller diameter (due to the helical antenna 10 having a fixed length and the size of each loop having to be greater when encircling an object having a larger diameter). While a given helical antenna 10 will tend to have a different number of loops depending on the diameter of the associated object B, it should be understood that the pitch of the helical antenna 10 does not depend on the diameter of the associated object B.

Figure 6:
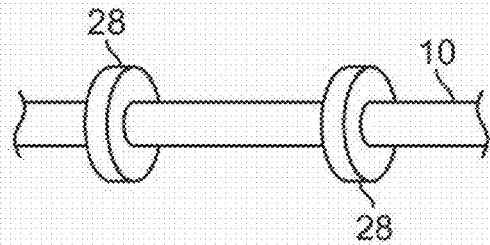
FIG. 6 is a detail view of a portion of a helical antenna having gripping elements.

The tendency of the helical antenna 10 to contact and grip the object B may be supplemented by at least one gripping element 28, as shown in FIG. 6. The gripping elements 28 have a greater sliding friction with the object B than the sliding friction of the helical antenna 10 with the object B, which causes the helical antenna 10 to be better retained in place on the object B. The nature of the gripping elements 28 may vary depending on the nature of the object B intended to be gripped by the helical antenna 10, but the gripping elements 28 may be formed of a rubber or silicone or other material in one embodiment. While FIG. 6 shows a plurality of gripping elements 28 spaced at discrete locations along the length of the helical antenna 10, it should be understood that an elongated gripping element may extend along the entire length or substantially the entire length of the helical antenna 10.

Figure 7:
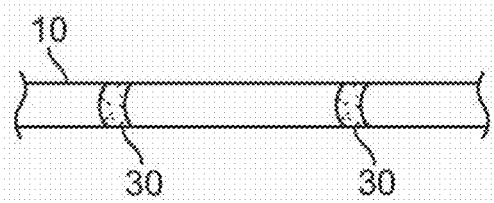
FIG. 7 is a detail view of a portion of a helical antenna having an adhesive applied in discrete locations.

In another embodiment, the tendency of the helical antenna 10 to contact and grip the object B may be supplemented by an adhesive 30, as shown in FIG. 7. The nature of the adhesive 30 may vary without departing from the scope of the present disclosure, but may be a hot melt, UV-cured, or pressure-sensitive adhesive in one embodiment. The adhesive 30 (which is shown in FIG. 7 as being applied in a plurality of discrete locations) adheres the helical antenna 10 to the object B at the locations in which the adhesive 30 is present, thereby preventing movement of the helical antenna 10 with respect to the object B. This is in contrast to the embodiment of FIG. 6, as the gripping elements 28 may allow some (albeit reduced) degree of movement of the helical antenna 10 with respect to the object B. As will be described in greater detail, it may be advantageous for at least a portion of the helical antenna 10 to be movable with respect to the object B, but the use of an adhesive 30 may be advantageous for those applications in which the helical antenna 10 (or at least a portion thereof) is to remain fixed in place. While FIG. 7 shows adhesive 30 applied in a plurality of discrete locations along the length of the helical antenna 10, it should be understood that adhesive may be applied along the entire length or substantially the entire length of the helical antenna 10.

Figure 8:
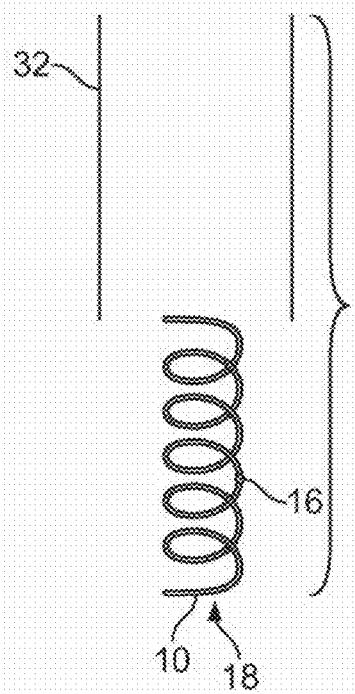
FIG. 8 is a side elevational view of a helical antenna and a heat shrink sleeve, with the helical antenna in an initial helical configuration and positioned externally of the heat shrink sleeve.
Figure 9:
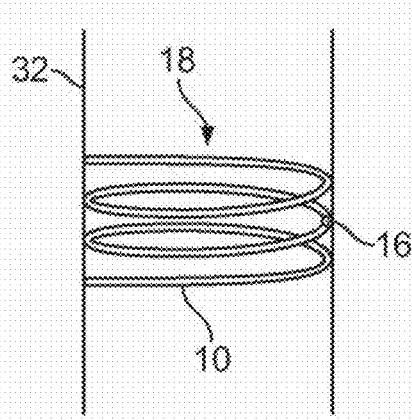
FIG. 9 is a side elevational view of the helical antenna and heat shrink sleeve of FIG. 8, with the helical antenna in an expanded helical configuration within the heat shrink sleeve to secure the heat shrink sleeve to the helical antenna.
Figure 10:
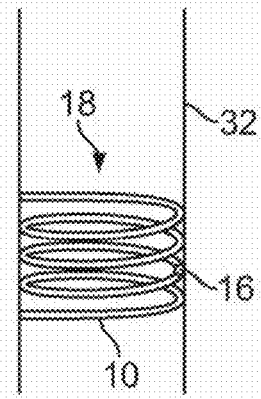
FIG. 10 is a side elevational view of the helical antenna and heat shrink sleeve of FIG. 9, with the heat shrink sleeve having been heated to reduce its diameter and to return the helical antenna from the expanded helical configuration of FIG. 9 toward the initial helical configuration of FIG. 8.

If the helical antenna 10 is not itself configured to resiliently return toward its initial helical configuration from the expanded helical configuration, separate means may be provided to return it from the expanded helical configuration toward the initial helical configuration. For example, FIGS. 8-10 show the helical antenna 10 with an associated heat shrink sleeve 32. The helical antenna 10 is provided in its initial helical configuration (FIG. 8), with the heat shrink sleeve 32 having an inner diameter that is greater than the diameter of the helical antenna 10 in its initial helical configuration. The helical antenna 10 is then moved into the heat shrink sleeve 32 and a force is applied to the helical antenna 10 to move it from its initial helical configuration to an expanded helical configuration, which may or may not include the helical antenna 10 coming into contact with the inner surface of the heat shrink sleeve 32 (FIG. 9). If the helical antenna 10 is brought into contact with the heat shrink sleeve 32, the heat shrink sleeve 32 may be secured to the helical antenna 10 at this time or may instead remain separate from the helical antenna 10. In either case, heat is applied to the heat shrink sleeve 32 to decrease its inner diameter, thereby causing the heat shrink sleeve 32 to press radially inwardly on the helical antenna 10 and return the helical antenna 10 toward its initial helical configuration to secure the helical antenna 10 to an object B.

Figure 11:
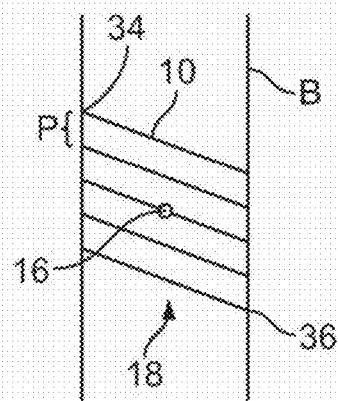
FIGS. 11 and 12 are side elevational views of two different configurations of the same helical antenna on the same object.
Figure 12:
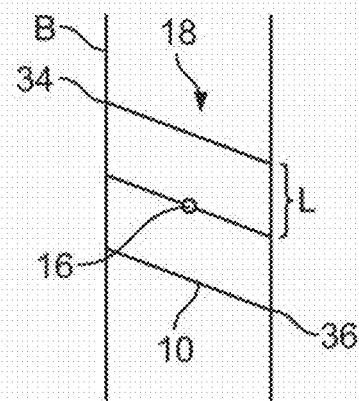

The configuration of the helical antenna 10 on the object B is determinative of various operational parameters of the flexible wire RFID tag 18 (e.g., the frequency at which the helical antenna 10 operates). Accordingly, if the helical antenna 10 is to be adhered to the object B, it may be advantageous to first move the helical antenna 10 into a preferred orientation before affixing the helical antenna 10 to the object B. For example, FIGS. 11 and 12 illustrate two different configurations of the same helical antenna 10 applied to the same object B, with the two configurations leading to different operational parameters. The helical antenna 10 has a fixed length, such that changing the pitch of the helical antenna 10 (identified in FIG. 11 at "P" and in FIG. 12 at "L") will change the total number of loops of the helical antenna 10. Comparing the orientations of FIGS. 11 and 12, the helical antenna 10 has a greater pitch L in FIG. 12, resulting in fewer loops, with reduced coupling between adjacent loops and with the helical antenna 10 overlaying a greater length of the object B. This causes the helical antenna 10 to operate closer to the performance of a half wave in the configuration of FIG. 12 than in the configuration of FIG. 11. The distance between the ends 34 and 36 of the helical antenna 10 (i.e., the length of the object B overlaid by the helical antenna 10) may also affect the optimum operating frequency, so the helical antenna 10 may have a different optimum operating frequency in the orientations of FIGS. 11 and 12. While FIGS. 11 and 12 show the helical antenna 10 with a constant pitch, it should be understood that its pitch may vary from one end 34 to the other end 36.

Figure 13:
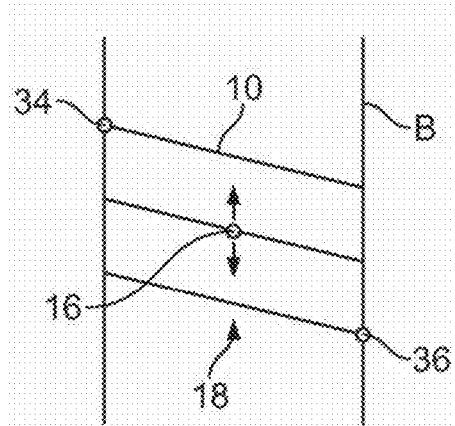
FIG. 13 is a side elevational view of a helical antenna mounted to an object, with both ends of the helical antenna secured to the object.

FIG. 13 illustrates another aspect of the present disclosure, which may be practiced with a helical antenna 10 (as in FIG. 13) or with a differently configured antenna (as will be described in greater detail herein). FIG. 13 shows an embodiment in which the two ends 34 and 36 of the helical antenna 10 are secured to the object B (e.g., by an adhesive 30). In such an embodiment, the diameter of the object B is preferably comparable to the diameter d of the open interior of the helical antenna 10 in its initial helical configuration. By such a configuration, the helical antenna 10 will not tightly grip the object B between the ends 34 and 36 of the helical antenna 10, which allows for the helical antenna 10 to vibrate and/or for its orientation to change, without the distance between the ends 34 and 36 changing. For example, the pitch of the helical antenna 10 may change, with the pitch in one region increasing and the pitch in another region decreasing to compensate for the increased pitch in the first region. If the RFID chip 16 is secured to the helical antenna 10 (as in FIG. 13), the position of the RFID chip 16 with respect to the object B may also vary as the orientation of the helical antenna 10 changes.

As described above, the vibration and/or change in configuration of the helical antenna 10 will change at least one of its operational parameters. The change in operation of the helical antenna 10 can be detected by an RFID reader, which registers a fluctuation in the phase and/or amplitude of the signal received by the RFID reader from the flexible wire RFID tag 18. This change in the signal that is received by the RFID reader is an indication that something is happening to or in the vicinity of the object B that is sufficient to change the configuration of the helical antenna 10 and/or to cause it to vibrate. What exactly may be determined by the change in the signal will depend upon the configuration of the helical antenna 10 and the type of stimulus that is sufficient to change the configuration of the helical antenna 10 and/or cause it to vibrate. For example, if the helical antenna 10 is configured such that movement of the associated object B is sufficient to deform the helical antenna 10 and/or cause it to vibrate, then the changing signal received by the RFID reader may be understood as an indication that the object B is being moved. Other possible stimuli (besides movement) could include sound (e.g., talking or shouting) or a specific frequency resonating with the motion.

This motion-activated modulation would allow the flexible wire RFID tag 18 to be used as an electronic article surveillance ("EAS") device. More particularly, a store exit may be provided with one or more RFID readers capable of detecting an item that has not been sold and the EAS function deactivated. Items carrying a flexible wire RFID tag having an active EAS function will have a characteristic modulation associated with movement upon the item being moved through the monitored store exit, which modulation will not take place for items on a store shelf or rack.

Figure 14:
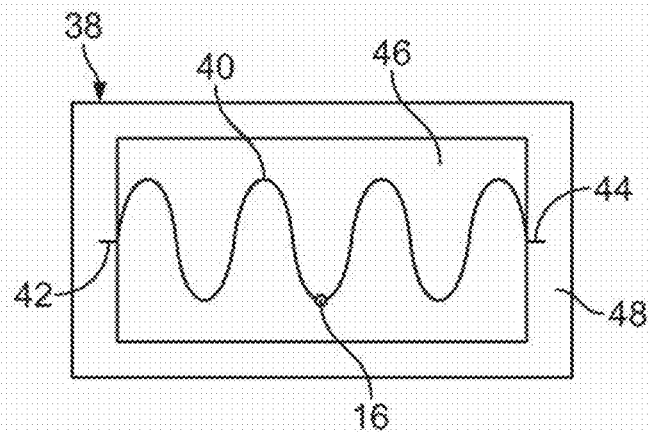
FIG. 14 is a top plan view of a flexible wire RFID tag incorporated into a frame, such as a cardboard ticket.
Figure 15:
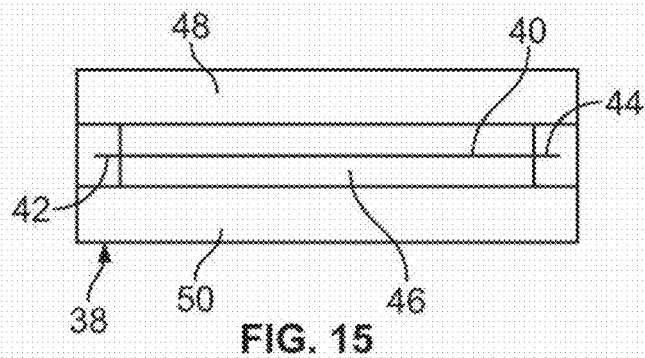
FIG. 15 is a side elevational view of the flexible wire RFID tag and frame of FIG. 14.
Figure 16:
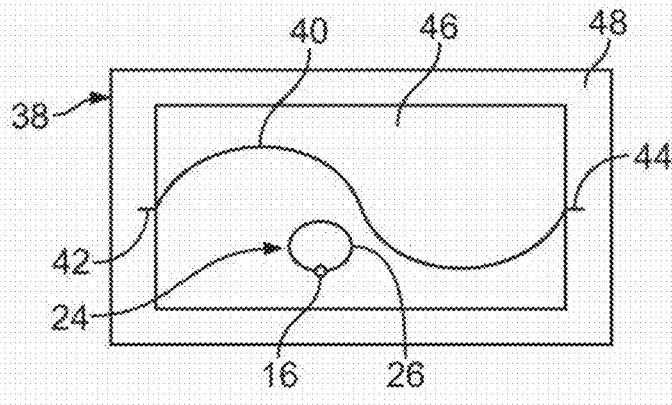
FIG. 16 is a top plan view of a flexible antenna and a reactive strap of a flexible wire RFID tag incorporated into a frame, such as a cardboard ticket.
Figure 17:
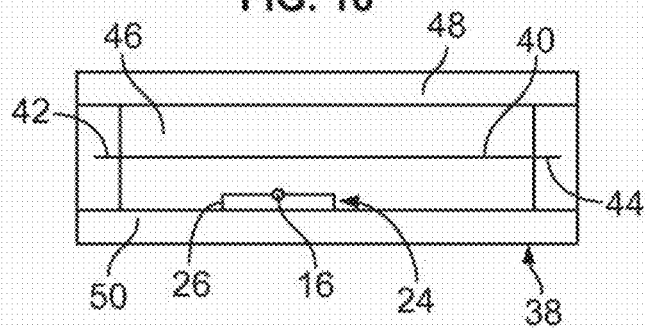
FIG. 17 is a side elevational view of the flexible wire RFID tag and frame of FIG. 16.

Stimulus-activated modulation is not limited to a helical antenna 10, but may also be practiced with a differently configured antenna of a flexible wire RFID tag. For example, FIGS. 14-17 show a flexible wire RFID tag incorporated into a frame 38, such as a cardboard ticket. The flexible wire RFID tag includes an RFID chip 16 and an associated antenna 40, which contains or includes a deformable filament or fiber and may be of the type used to form a helical antenna 10, as described herein. FIGS. 14 and 15 show the RFID chip 16 secured to the deformable antenna 40, while FIGS. 16 and 17 show an RFID chip 16 secured to a wire loop 26 as part of a reactive strap 24 of the type shown in FIG. 4 and described above.

Regardless of the position of the RFID chip 16 with respect to the deformable antenna 40, the ends 42 and 44 of the deformable antenna 40 are secured to the frame 38, with the midsection of the antenna 40 extending across a cavity 46 defined by the frame 38. In the embodiments of FIGS. 14-17, the frame 38 includes upper and lower covers 48 and 50, with the ends 42 and 44 of the deformable antenna 40 positioned between the upper and lower covers 48 and 50. If the RFID chip 16 is incorporated into a reactive strap 24 (as in FIGS. 16 and 17), it may be secured to any surface of the frame 38, including either the upper cover 48 or (as shown in FIG. 17) the lower cover 50.

The midsection of the deformable antenna 40 is free to move and, upon exposure to a sufficient stimulus, will deform and/or vibrate and change at least one of its operational parameters. In accordance with the foregoing description of the assembly of FIG. 13, the stimulus may be movement of the frame 38 or a sound or the like. As also described above with respect to the embodiment of FIG. 13, the assemblies of FIGS. 14-17 may be used for EAS, with a changing signal indicating movement and possible theft of the frame 38 or a piece of merchandise associated with the frame 38.

Figure 18:
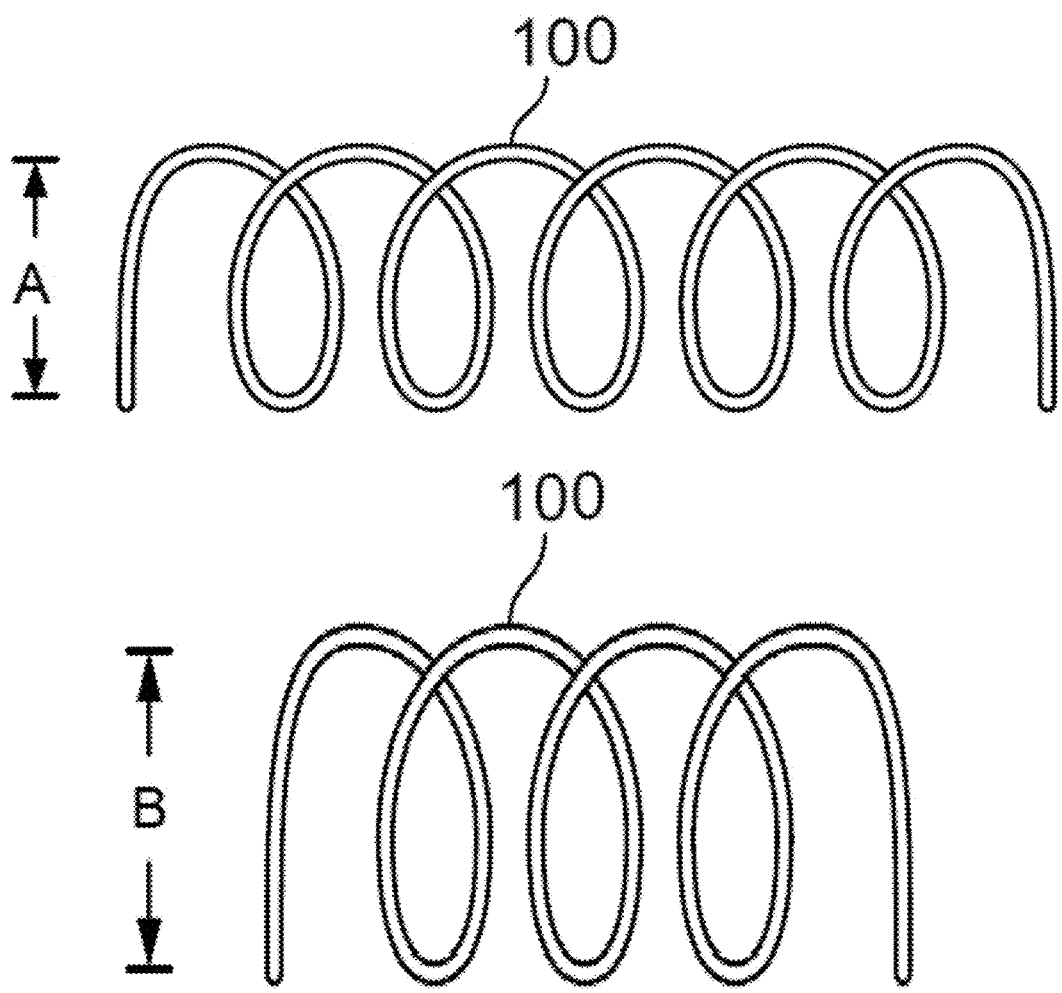
FIG. 18 is an illustration of a helical tag reduced in diameter from an expanded state B to a compressed state A.
Figure 19:
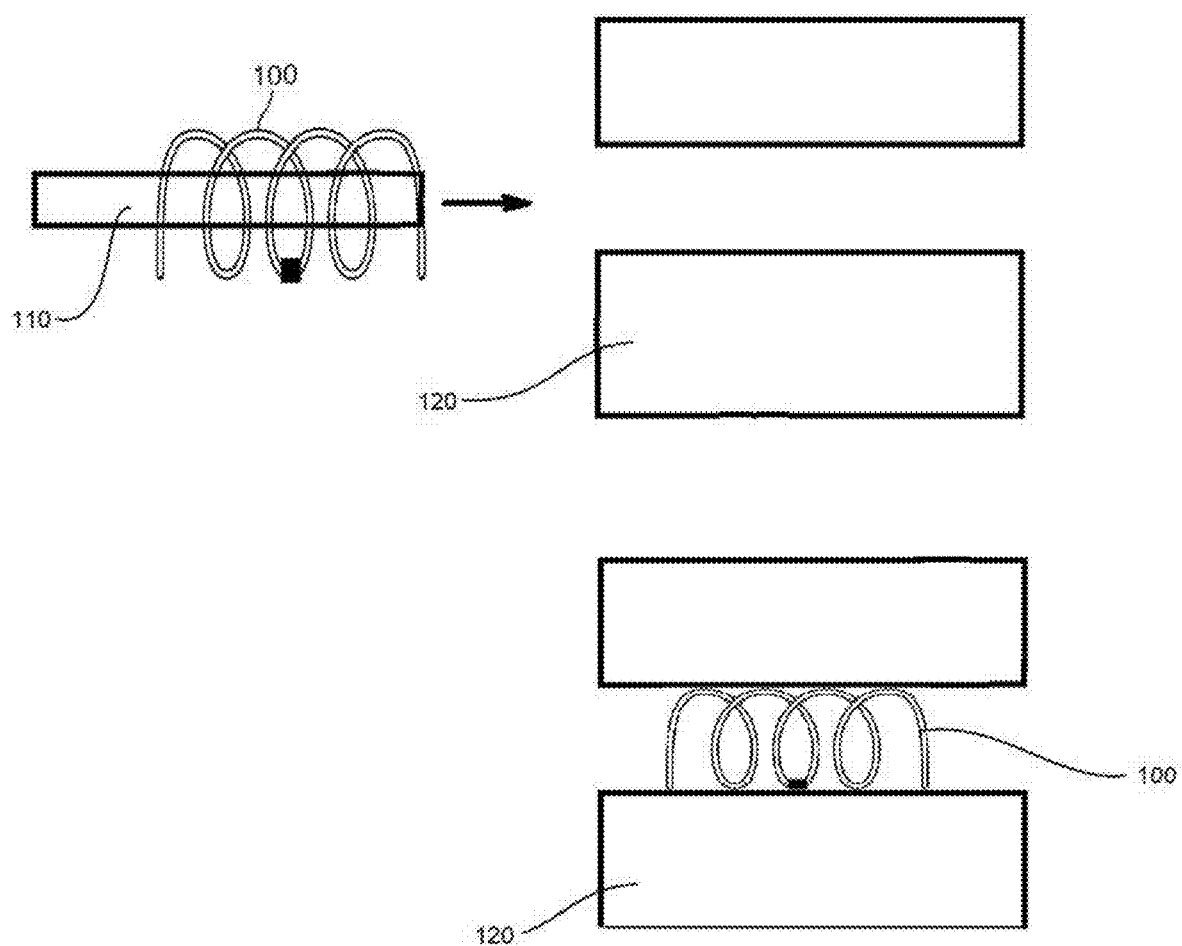
FIG. 19 is an illustration of how a helical tag can be compressed and inserted into an opening greater than the compressed diameter.

An alternative embodiment of the invention is illustrated in FIG. 18. In this configuration the helical RFID tag 100 can be reduced in diameter from expanded state to B to compressed state A. It should be noted that according to one aspect of the invention, as the diameter decreases, a number of individual coils increases. Alternatively, as the dimeter decreases, the overall length of the helical RFID tag 100 increases. FIG. 19 illustrates how this may be utilized. In its compressed, reduced diameter state, created by applying a twist using a tool 110 or stretching the length of the coil 100, it can be inserted into a hole in a structure 120 of a diameter slightly greater than the compressed diameter. When the tool is removed, the tag coil 100 attempts to return to its original diameter, and applies force to the sides of the hole in the structure 120, anchoring the tag in place. If the hole is in a dielectric material such as plastic or other polymeric material, the helical RFID tag will continue to operate, or if the tag goes into a nonconductive sleeve of a defined thickness, e.g., 1 mm that isolates the helical tag from the metal.

Figure 20:
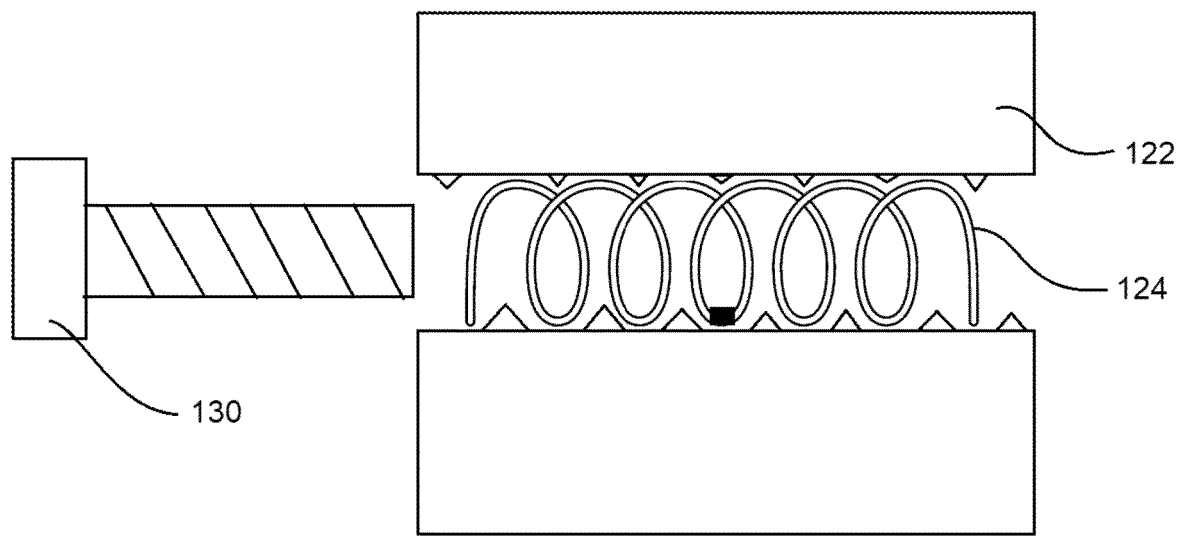
FIG. 20 is an illustration of an expanded helical tag engaged with one or more helical threads introduced into or onto an opening.

FIG. 20 illustrates another embodiment where the helical tag 124, when expanding from its reduced diameter to grip the hole, engages with a helical thread cut into the hole of structure 122. According to one aspect of the invention, the helical tag 124 is a thin wire. Once engaged a suitable bolt 130, with adequate clearance, can be placed in the hole, anchoring the tag and, if required, acting as part of an overall assembly. According to one aspect of the invention, the bolt 130 is a plastic, nylon, or other nonconductive material.

Figure 21:
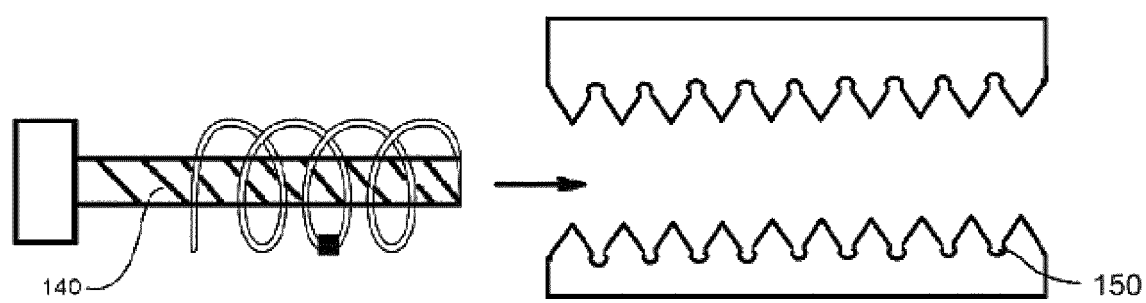
FIG. 21 is an illustration of an expanded helical tag engaged with one or more helical thread wherein the helical threads have an additional cavity to allow for the introduction of the helical tag.

FIG. 21 shows a variation of FIG. 20 where the helical thread has an additional cavity 150 at its base designed for the helical tag; the helical tag is expanded and engaged with the threads on the bolt 140 before securing it into the threaded hole. The cavity 150 at the base of the threaded hole allows the thickness of the wire to be accommodated when the bolt is tightened.

Figure 22:
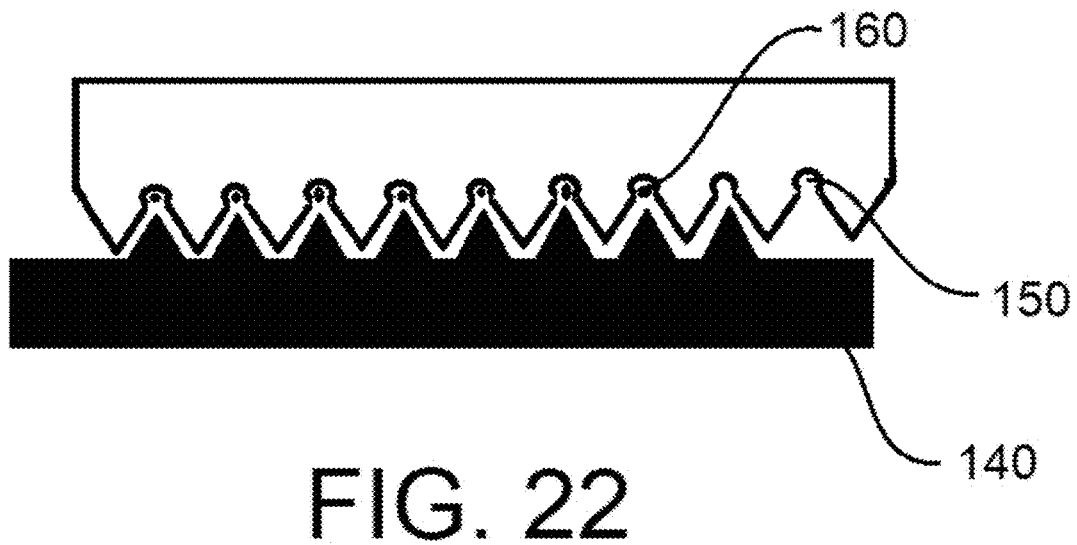
FIG. 22 illustrates a helical tag expanded into the thread cut into an opening, where the thread has a cavity at the base and a bolt can be screwed into the hole without applying force to the helical tag which is in the cavity at the base of the hole.

FIG. 22 shows another embodiment, in cross section, where the helical tag is expanded into the thread cut into the hole, where the thread has a cavity 150 at the base as previously shown for the conductor, such as wire 160. A bolt 140 can be screwed into the hole without applying force to the helical tag which is in the cavity at the base of the hole. As shown, there is a separation or gap between the bolt and the threads. The separation or gap is configured to form a trench transmission line. It should be noted that the cavity can alternatively be formed in the bolt.

It will be understood that the aspects, embodiments and examples described herein are illustrative examples of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A flexible radio frequency identification (RFID) wire tag comprising:
   an RFID chip; and
   a helical antenna associated with the RFID chip, wherein:
      the helical antenna is configured to be deformed from an initial helical configuration in which an open interior of the helical antenna has a first diameter to an expanded helical configuration in which the open interior of the helical antenna has a second diameter that is greater than the first diameter;
      the flexible RFID wire tag is configured to return the helical antenna from the expanded helical configuration toward the initial helical configuration, such that an object or a portion of an object positioned within the open interior of the helical antenna in the expanded helical configuration and having an outer diameter greater than the first diameter will be contacted and gripped by the flexible RFID wire tag as the helical antenna is returned from the expanded helical configuration toward the initial helical configuration, and at least one gripping element configured to have a greater sliding friction with the object or the portion of the object than the helical antenna, wherein the at least one gripping element is positioned along a length of the helical antenna, and wherein the at least one gripping element is formed of any one of: a rubber and a silicone material.

2. The flexible RFID wire tag of claim 1, wherein the helical antenna comprises a memory wire.

3. The flexible RFID wire tag of claim 2, wherein the helical antenna comprises a spring steel material.

4. The flexible RFID wire tag of claim 1, wherein the helical antenna comprises a core and a coating overlaying at least a portion of the core and formed of a material having a greater conductivity than the core.

5. The flexible RFID wire tag of claim 4, wherein the core comprises a metallic material.

6. The flexible RFID wire tag of claim 5, wherein the core comprises a spring steel material and the coating comprises a copper or silver material.

7. The flexible RFID wire tag of claim 4, wherein the core comprises a plastic material.

8. The flexible RFID wire tag of claim 7, wherein the coating comprises at least one of a conductive ink and foil material.

9. The flexible RFID wire tag of claim 1, further comprising an adhesive positioned at discrete locations along the helical antenna and configured to adhere the helical antenna to the object or portion of an object.

10. The flexible RFID wire tag of claim 1, further comprising an adhesive positioned along an entire length of the helical antenna and configured to adhere the helical antenna to the object or portion of an object.

11. The flexible RFID wire tag of claim 1, further comprising a heat shrink sleeve surrounding at least a portion of the helical antenna and configured to be heated to decrease an inner diameter of the heat shrink sleeve to return the helical antenna from the expanded helical configuration toward the initial helical configuration.

12. The flexible RFID wire tag of claim 1, wherein the RFID chip is secured to the helical antenna, with a first section of the helical antenna positioned on one side of the RFID chip and a second section of the helical antenna positioned on an opposite side of the RFID chip.

13. The flexible RFID wire tag of claim 12, wherein a pitch of the first section of the helical antenna is different from a pitch of the second section of the helical antenna.

14. The flexible RFID wire tag of claim 1, wherein the RFID chip is not secured to the helical antenna.

15. The flexible RFID wire tag of claim 14, wherein the RFID chip is incorporated into a reactive strap comprising a wire loop having a known resonance.

16. A method of securing a flexible radio frequency identification (RFID) wire tag to an object or a portion of an object, comprising:
providing a flexible RFID wire tag including an RFID chip and a helical antenna associated with the RFID chip;
deforming the helical antenna from an initial helical configuration in which an open interior of the helical antenna has a first diameter to an expanded helical configuration in which the open interior of the helical antenna has a second diameter that is greater than the first diameter;
positioning an object or a portion of an object having an outer diameter greater than the first diameter within the open interior of the helical antenna in the expanded helical configuration;
returning the helical antenna from the expanded helical configuration toward the initial helical configuration so as to cause the object or portion of an object to be contacted and gripped by the helical antenna as the helical antenna is returned from the expanded helical configuration toward the initial helical configuration, wherein the helical antenna includes first and second ends; and
securing each end of the helical antenna to the object or the portion of the object so as to allow the helical antenna to be deformed so as to modify at least one operational parameter of the helical antenna.

17. The method of claim 16, wherein
the flexible RFID wire tag includes a heat shrink sleeve surrounding at least a portion of the helical antenna, and
the returning the helical antenna from the expanded helical configuration toward the initial helical configuration includes heating the heat shrink sleeve to decrease an inner diameter of the heat shrink sleeve to return the helical antenna from the expanded helical configuration toward the initial helical configuration.

18. The method of claim 16, further comprising adhering the flexible RFID wire tag to the object or the portion of the object.

19. The method of claim 16, wherein the flexible RFID wire tag is configured such that the deformation of the helical antenna is caused by movement of the object or the portion of the object.

20. The method of claim 16, wherein the flexible RFID wire tag is configured such that the deformation of the helical antenna is caused by sound waves.

21. The method of claim 16, wherein
the RFID chip is secured to the helical antenna, with a first section of the helical antenna positioned on one side of the RFID chip and a second section of the helical antenna positioned on an opposite side of the RFID chip, and
each section of the helical antenna includes an end spaced from the RFID chip, and further comprising adjusting a distance between the RFID chip and at least one of the ends of the helical antenna to tune the helical antenna.

22. The method of claim 16, wherein the RFID chip is incorporated into a reactive strap comprising a wire loop having a known resonance, and further comprising securing the reactive strap to the object or the portion of the object.

* * * * *